N. P. NELSON.
STEERING DEVICE.
APPLICATION FILED OCT. 19, 1915.
1,168,956.
Patented Jan. 18, 1916.
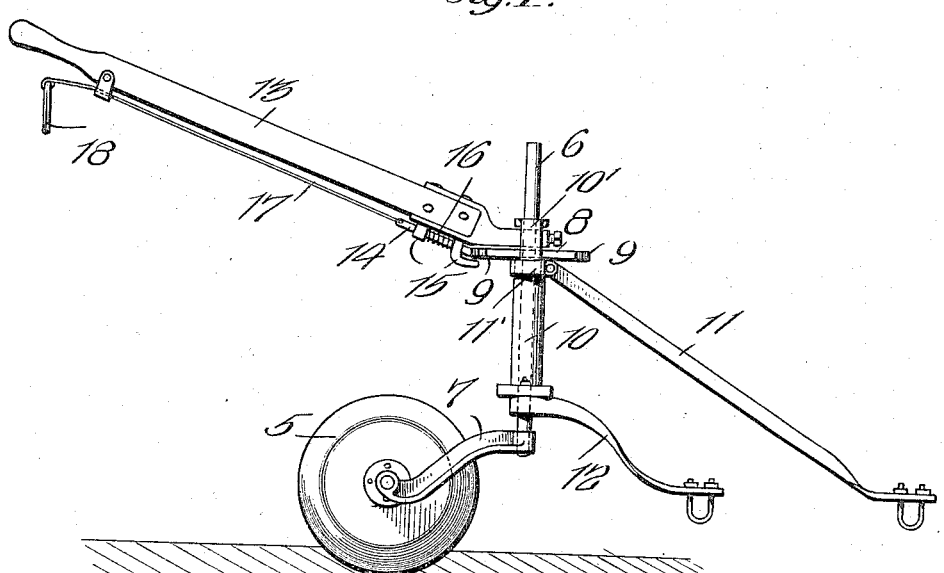
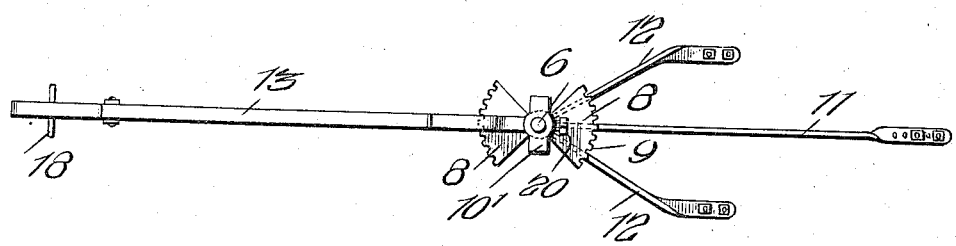
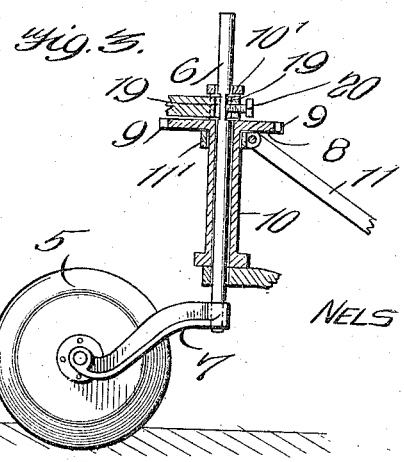
WITNESSES:
INVENTOR
NELS P. NELSON,
BY Munn & Co.
ATTORNEYS

UNITED STATES PATENT OFFICE.

NELS P. NELSON, OF NEWBERG, OREGON.

STEERING DEVICE.

1,168,956.  Specification of Letters Patent.  Patented Jan. 18, 1916.

Application filed October 19, 1915. Serial No. 56,748.

*To all whom it may concern:*

Be it known that I, NELS P. NELSON, a citizen of the United States, and a resident of Newberg, in the county of Yamhill and State of Oregon, have invented an Improvement in Steering Devices, of which the following is a specification.

This invention is an improvement in steering devices and has particular reference to a reversible handle therefor.

An object of the invention is to provide a device which may be employed in connection with any character of machine, such as seed planters and other agricultural machines and the like, the device including a caster-wheel having a spindle extending through a bearing provided with a toothed plate adapted to be engaged by an adjustable part of a handle whereby the lattter may be releasably held in any adjusted position.

Another object of the invention is the provision of a device of this kind which is simple in construction, easy to manufacture, readily applied to any kind of machine, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a side elevation of the device constructed in accordance with the invention. Fig. 2 is a top plan view thereof. Fig. 3 is a side elevation of the caster-wheel and its attachments, the toothed plate being shown in section.

Referring more particularly to the accompanying drawing, in which like reference characters indicate similar parts, the numeral 5 indicates a caster-wheel having a vertical spindle 6 connected thereto by means of the arm 7. This caster-wheel or coulter blade is adapted to bury into the ground to a sufficient depth whereby the machine is effectively prevented from skidding when the same is being guided.

Loosely mounted upon the spindle 6 is a bearing 10 through which said spindle extends, said bearing being located between the arm 7 and the plate 8 the latter being preferably formed integral with said bearing at the upper end thereof. The downwardly extending bracket 11 is connected to a collar 11' mounted upon the bearing 10 below the plate 8. The lower end of the bearing has extending therefrom the diverging brackets 12 which are adapted to be secured to any suitable part of a machine to which the steering device is adapted to be applied. The upper end of the bearing 10 is provided with a bracket 10' and has associated therewith the operating handle 13 which is adapted to be interlocked with the plate 8 so that the spindle 6 may be rotated in either direction to shift the caster 5 whereby to steer the machine. This interlocking engagement is accomplished by means of a pawl 14 slidably mounted in a bearing 15 carried by the handle 13, the free end of said pawl being adapted to engage in one of the teeth 9 and releasably held in engagement therewith by a spring 16 mounted between the bearings 15. The other end of the pawl 14 has connected thereto one end of a rod 17 the other end of which is provided with a hand grip 18 adjacent the free end of the handle 13, said grip being adapted to be pulled outwardly to release the pawl 14 from engagement with the teeth of the plate 8 whereby the handle 13 may be swung to any desired position. In mounting the steering device on some forms of machines it may be desirable to have the handle 13 extend in an opposite direction to that shown in Fig. 1 and for this purpose the plate 8 has been made into the form of a double segment so that the pawl 14 will be associated with oppositely disposed series of teeth.

There is also provided, in connection with the invention, a means for vertically adjusting the spindle 6 relative to the handle 13 whereby to regulate the depth to which the caster wheel is to extend into the ground. For this purpose the spindle 6 is provided with oppositely disposed longitudinally extending slots which are engaged by a fastening bolt 20 carried by the handle 13 thus permitting an adjustment of the spindle by simply loosening the bolt.

What is claimed is:—

1. A steering device of the charatcer described comprising a caster-wheel, a spindle therefor, a bearing mounted on said spindle and having brackets extending therefrom adapted for attachment to a machine, a plate formed integral with said bearing and having oppositely disposed series of teeth, a handle associated with said spindle, a spring pressed pawl carried by said handle and adapted for engagement with either series of teeth whereby to retain said handle in adjusted position and rotate said spindle, and means for withdrawing said pawl from engagement with said teeth.

2. A steering device of the character described comprising a caster-wheel, a spindle therefor, bearings mounted on said spindle and having brackets extending therefrom adapted for attachment to a machine, a plate formed integral with said bearing and having oppositely disposed series of teeth, a handle associated with said spindle, and means carried by the handle and adapted for releasable engagement with said teeth whereby to retain said handle in adjusted position and rotate said spindle.

3. A steering device of the character described comprising a rotatable element, a bearing associated therewith, a plate carried by the bearing and including oppositely disposed toothed segments, and an operating handle having means engaging said plate whereby to guide said rotatable element.

4. A steering device of the character described comprising a rotatable element, a bearing associated therewith, a plate carried by the bearing and including oppositely disposed toothed segments, an operating handle having means engaging said plate whereby to guide said rotatable element, and means for vertically adjusting said rotatable element.

NELS P. NELSON.

Witnesses:
F. A. Morris,
N. F. Byers.

Copies of this patent may be obtained for five cents each, by addressing the "Commissioner of Patents, Washington, D. C."